United States Patent [19]
Omi et al.

[11] Patent Number: 5,687,029
[45] Date of Patent: Nov. 11, 1997

[54] LENS BARREL HAVING COLLAPSING AND EXTENDING USE GROOVES

[75] Inventors: Junichi Omi, Kawasaki; Kiyosada Machida, Urawa; Hiroshi Wakabayashi, Yokohama, all of Japan

[73] Assignee: Nikon Corporation, Tokyo, Japan

[21] Appl. No.: 638,750

[22] Filed: Apr. 29, 1996

[30] Foreign Application Priority Data

Apr. 27, 1995 [JP] Japan ................................. 7-103518

[51] Int. Cl.[6] .................................................. G02B 15/14
[52] U.S. Cl. ......................... 359/700; 359/703; 359/704; 359/699
[58] Field of Search ........................... 359/819, 699, 359/700, 701, 694, 703, 704

[56] References Cited

U.S. PATENT DOCUMENTS

| | | | |
|---|---|---|---|
| 4,958,178 | 9/1990 | Yoshida | 354/195.12 |
| 5,196,963 | 3/1993 | Sato | 359/699 |
| 5,373,397 | 12/1994 | Satoh | 359/699 |
| 5,570,149 | 10/1996 | Wakabayashi | 396/85 |
| 5,576,893 | 11/1996 | Yamanouchi | 359/701 |

Primary Examiner—David C. Nelms
Assistant Examiner—Ricky Mack

[57] ABSTRACT

A lens barrel having first and second lens groups and first and second tubes. The first tube has first and second guide grooves to respectively guide the first and second groups in an optical direction. The second tube has first and second cam grooves to respectively guide the first and second lens groups, in conjunction with the first and second guide grooves, for focusing and zooming operations. A first collapsing use groove extends substantially perpendicular to the optical axis from an end of the second guide groove that is closer to an image surface to maintain the second lens group in a stationary position on the optical axis when the first lens group is collapsed toward the second lens group and when the first lens group is extended into a wide state. A second collapsing use groove extends substantially perpendicular to the optical axis from an end of the second cam groove that is closer to the image surface and overlaps the first collapsing use groove to perform the same functions as the first collapsing use groove. The first cam groove is inclined with respect to the optical axis and the second cam groove includes a wide state focusing portion extending substantially parallel to the first cam groove from an end of the second collapsing use groove portion to guide the second lens group uniformly with a movement of the first lens group for focusing of the first and second lens groups in the wide state. The second cam groove above the wide state focusing portion is a stepped groove having alternating zooming portions and focusing portions, wherein the zooming portions are inclined from the optical axis and the focusing portions are substantially perpendicular to the optical axis.

9 Claims, 6 Drawing Sheets

LENS BARREL HAVING COLLAPSING AND EXTENDING USE GROOVES

BACKGROUND OF THE INVENTION

1. Field of the Invention

The present invention relates to camera lens barrels. More specifically, the present invention relates to a lens barrel with guide grooves and cam grooves that allow integral and successive focusing, zooming, and collapsing movements.

2. Description of the Related Art

Some recent compact cameras employ multifunctional zoom lens barrels which can freely perform photography from telephoto to wide angle. In order to conform to demands for small size and thin shape, such lens barrels are generally of the. collapsible mount type wherein the lens barrel of the zoom lens retracts into the camera body.

This type of zoom lens barrel has at least two or more lens groups which am positioned to move freely back and forth. Focusing is accomplished by changing the interval between the lens groups. Photography can be performed at optional image magnification by performing a zooming movement which changes the focal length. Such zoom lens barrels are also known to include a straight guide tube disposed in the camera body. The straight guide tube has plural guide grooves formed in an axial direction in the circumferential surface (i.e., along the optical axis direction).

Plural lens groups are positioned to be freely movable back and forth in the optical axis direction within the straight guide tube. The lens groups are supported in lens holders having coupling pins respectively inserted into the aforementioned guide grooves of the straight guide tube. Zoom cam ring(s) are also mounted for free rotation in the outer circumference of the straight guide tube. The zoom cam ring(s) have plural cam grooves inclined with respect to the optical axis. The zoom cam ring(s) are coupled to the straight guide tube by the coupling pins of each lens holder which are inserted through the guide grooves of the straight guide tube and into the cam grooves in the cam ring(s). See, for example, Japanese Laid-Open Patent Publication JP-A-4-278932

In a compact camera equipped with the above described zoom lens, the zooming action of the lens groups in the lens barrel, from snapshot or operational aspects, is accomplished by rotating the zoom cam ring by a drive source (i.e., an electric motor or the like), assembled within the camera body. The drive source also controls the interval of the respective lens groups by moving them back and forth integrally with their lens holders to change the focus.

FIG. 8 is a detailed diagram of a zoom cam ring 1, showing the shape of prior art guide grooves and cam grooves and their relationship within the cam, in a zoom type lens barrel. The circumferential length of the zoom cam ring 1 is "A". A plurality of first and second cam grooves 2 and 3 are formed alternately, equally distributed in the circumferential direction of the zoom cam ring 1. These cam grooves 2 and 3 regulate the rotation of a first and second lens groups, in addition to regulating the stroke (i.e., linear movement along the direction of the optical axis) of the lens groups. The first cam groove 2 is inclined to intersect the optical axis at a predetermined angle β.

The second cam groove 3 is a crooked groove formed in the reverse shape of the character "∧". The second cam groove 3 includes groove portions 3a and 3b. The groove portion 3a is used for collapsing. The groove portion 3b is used for zooming. The groove portion 3a extends parallel to the film surface in the circumferential direction of the zoom cam ring 1 to the side of the zoom cam ring 1 where the interval between the lens groups is wide, i.e., at the wide end "b ". The zoom groove portion 3b starts at the wide end "b" of groove portion 3a (opposite to the collapse end "a") and extends toward the photography subject side of zoom cam ring 1, i.e., toward telephoto end "c". The arrow 9 shows the direction of the photography subject. The groove portion 3b is inclined at an inclination angle α across the optical axis. The angle of inclination a of groove portion 3b is the angle to the film surface, which is at right angles to the optical axis. The angle of inclination α is set greater than the angle of inclination β of the first cam groove 2.

First and second guide grooves 4 and 6 are adjacently formed in the circumferential surface of a straight guide tube (not shown). The first and second guide grooves 4 and 6 are also parallel to the optical axis.

The first cam groove 2 and the first guide groove 4 are coupled by coupling pins 5 inserted through both grooves and disposed in a lens holder (not shown) which supports a first lens group. The first lens group, which is closer to the photography subject, moves back and forth along the first guide groove 4 in the straight guide tube, guided by the first cam groove 2.

The second cam groove 3 and the second guide groove 6 are coupled by coupling pins 7 inserted through both grooves and disposed in a lens holder (not shown) which supports a second lens group. The second lens group, which is farther from photography subject, moves back and forth along the second guide groove 6 in the straight guide tube, guided by the second cam groove 3.

The coupling pins 5 and 7 are depicted in FIG. 8 in a position corresponding to a collapsed state of the lens groups, when no photography is taking place in other words, the coupling pins 5 and 7 are at the collapse end "a" of the first and second cam grooves 2 and 3, away from the photography subject. In the collapsed state when no photography is taking place, the interval between the two lens groups are as small as possible in order to provide a thin shape and smaller size for the camera.

When the zoom cam ring 1 rotates in the direction of the extension direction 8, coupling pin 5 moves up the inclined first cam groove 2 and coupling pin 7 moves toward the wide end "b" of the second cam groove 3. The interval between the first and second lens groups is greatest when the coupling pin 7 is at the wide end "b" (hereinafter, "Wide state"). When the zoom cam ring 1 rotates further, i.e., from the wide end "b"to the telephoto end "c", the interval between the first and second lens groups narrows while the distance of the lens groups from the film surface increases.

As mentioned above, it is desirable to make the interval between the lens groups as close to zero as possible in the collapsed state in order to provide a thin, miniaturized camera design. However, with a conventional lens barrel, it may be difficult to make the interval between lens groups small (i.e., close to zero) because of structural reasons.

For instance, consider the problems associated with the length of the groove portion 3a of the second cam groove 3. Even if the stroke and rotation angle of the first and second cam grooves 2 and 3 are the same (such as in the case of a lens system in which the amount of collapse from the wide end "b" is large or in the case in which the stroke is enlarged from the wide end "b" to the collapse end "a"). in order to make the camera body thin, the length of the groove portion 3a shown in FIG. 9 becomes long in comparison with the groove portion 3a of FIG. 8. Because of this, the collapse end "a" of the first cam groove 2 and the wide end "b" of the groove portion 3a mutually interfere and make the extension and retraction movements of the lens groups difficult.

Another problem can be seen when the lens barrel diameter is made smaller (as shown in FIG. 10) to make the camera more compact. The circumferential length "B" of the zoom cam ring 1' depicted in FIG. 10 is shorter than the circumferential length "A" of the cam ring 1 shown in FIG. 8. In the lens barrel of FIG. 10, when the first cam groove 2 and second cam groove 3 are formed with the same shape and dimensions as in FIG. 8, the rotation angle of the zoom cam ring 1' becomes large. Moreover, because the pitch of the first and second cam grooves 2 and 3 becomes small, mutual interference arises at their respective collapse position "a".

In order to solve such problems, angle of inclination β (with respect to the film surface) of the first cam groove 2 may be made larger. When this is done, the rotation angle of the zoom cam ring 1' is made small with respect to the whole stroke of the lens group(s). In addition, the interference of the first and second cam grooves 2 and 3 is prevented.

However, when the angle of inclination β becomes large, a larger drive motor having a larger drive force is necessary because the rotary load also increases for the rotation of the zoom cam ring 1'. Such a requirement hinders the goal of making the camera compact. Accordingly, making the lens barrel smaller (as shown in FIG. 10) conflicts with the goal of making the camera compact.

In zoom lens barrels described above, the collapsible mount type of lens barrel was used. Despite the problems described above regarding the difficulties for reducing the interval between the lens groups to zero in the collapsed state, such conventional multifunctional zoom lens barrels demonstrate some benefits. For instance, collapsing the lens barrel into the camera can be performed smoothly by means of a single drive source. Moreover, performing the zooming movement and the focusing movement by means of the single drive source is also desirable. Other multifunctional zoom lens barrels known in the art employ step cam grooves to provide alternate and successive zooming and focusing movements. However, such other conventional lens barrels with step cam grooves do not use the same drive source for collapsing, zooming, and focusing, and have the problems described below.

For example, JP-A-60-102437, JP-A-63-287833, and JP-A-63-303327, disclose structures in which the zooming movement and the focusing movement of the lens system are performed in successive zooming and focusing steps in step cam grooves. Such lens systems include a variable power convertible zoom type lens barrel or a zoom type of lens barrel in which the focal length of a photographic lens can be changed. In these known structures, cam grooves are formed in a zoom cam tube in order to allow back and forth movement of plural lens groups within a lens barrel. The cam grooves are formed as step cam grooves. The step cam grooves are divided into focusing regions and zooming regions. The focusing regions are substantially perpendicular to the optical axis and substantially parallel to the film surface. The zooming regions are inclined with respect to the optical axis. By rotating such a zoom cam tube, zooming action and focusing action are alternately and successively performed in the respective regions of the step cam grooves. By using step cam grooves formed in the zoom cam tube, the zooming movement and the focusing movement could be performed by the same drive source, for example, an electric motor and the like.

However, such a lens barrel with step cam grooves does not include the driving of a collapsing movement by the single drive source. The zooming movement and the focusing movement are performed by the same drive source, but the collapsing movements are not performed integrally with the zooming or focusing movements by the same driving source. Nor does such a lens barrel include an integral extension movement to a Wide state from a collapsed state by means of the single drive source.

Other lens barrels of the type allowing the lens groups within the lens barrel to be gathered into the closest state to each other when performing the collapsing movement are generally known in the prior art. Measures to extend or retract the whole lens system are also provided in a camera with such a lens barrel. However, such lens barrels required the use of separate drive sources, e.g., separate suitable electical actuators, for driving the zooming and focusing movements versus driving the collapsing movement. And, such lens barrels may have the problems described above regarding FIGS. 8–10.

SUMMARY OF THE INVENTION

Accordingly, it is an object of the present invention to provide a lens barrel in which the zooming, focusing, and collapsing of lens groups are performed smoothly, integrally, and successively by a single drive source.

It is a further object of the present invention to provide a lens barrel in which the zooming, focusing, and collapsing of lens groups are accomplished with a simple structure.

It is another object of the present invention to provide a lens barrel in a collapsible mount type camera with reduced size and cost.

Objects of the present invention are achieved by providing a lens barrel having first and second lens groups and first and second tubes. The first tube has first and second guide grooves to respectively guide the first and second groups in an optical direction. The second tube has first and second cam grooves to respectively guide the first and second lens groups, in conjunction with the first and second guide grooves, for focusing and zooming operations. A first collapsing use groove extends substantially perpendicular to the optical axis from an end of the second guide groove that is closer to an image surface to maintain the second lens group in a stationary position on the optical axis when the first lens group is collapsed toward the second lens group and when the first lens group is extended into a wide state. A second collapsing use groove extends substantially perpendicular to the optical axis from an end of the second cam groove that is closer to the image surface and overlaps the first collapsing use groove to perform the same functions as the first collapsing use groove. The first cam groove is inclined with respect to the optical axis and the second cam groove includes a wide state focusing portion extending parallel to the first cam groove from an end of the second collapsing use groove portion to guide the second lens group uniformly with a movement of the first lens group for focusing of the first and second lens groups in the wide state. The second cam groove (above the wide state focusing portion) is a stepped groove having alternating zooming portions and focusing portions, wherein the zooming portions are inclined from the optical axis and the focusing portions are substantially perpendicular to the optical axis.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
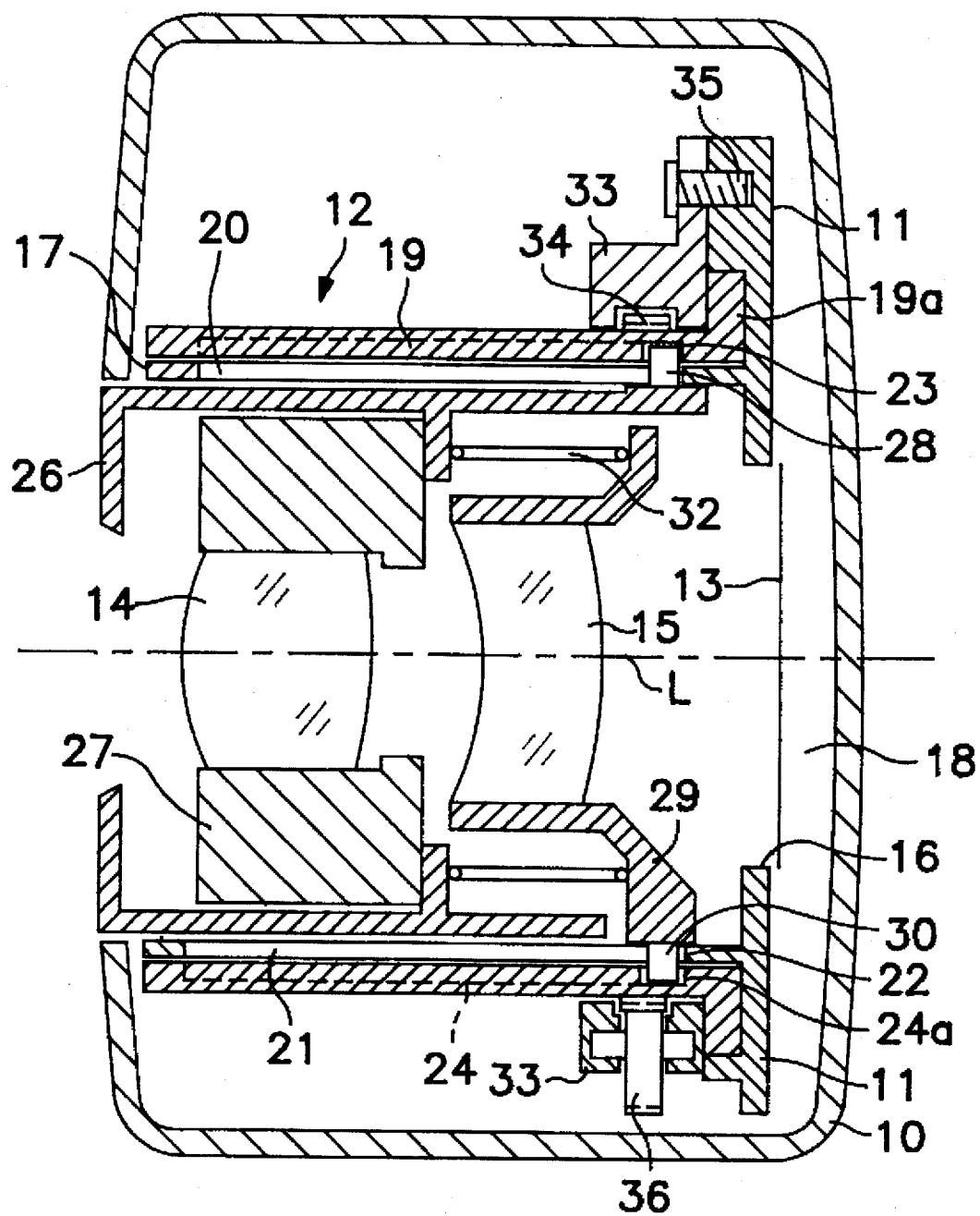
FIG. 1 is a cross sectional diagram of a collapsed state of a preferred embodiment of a zoom type lens barrel according to the present invention.

Reference will now be made in detail to the present preferred embodiments of the present invention, examples of which are illustrated in the accompanying drawings, wherein like reference numerals refer to like elements throughout.

Figure 2:
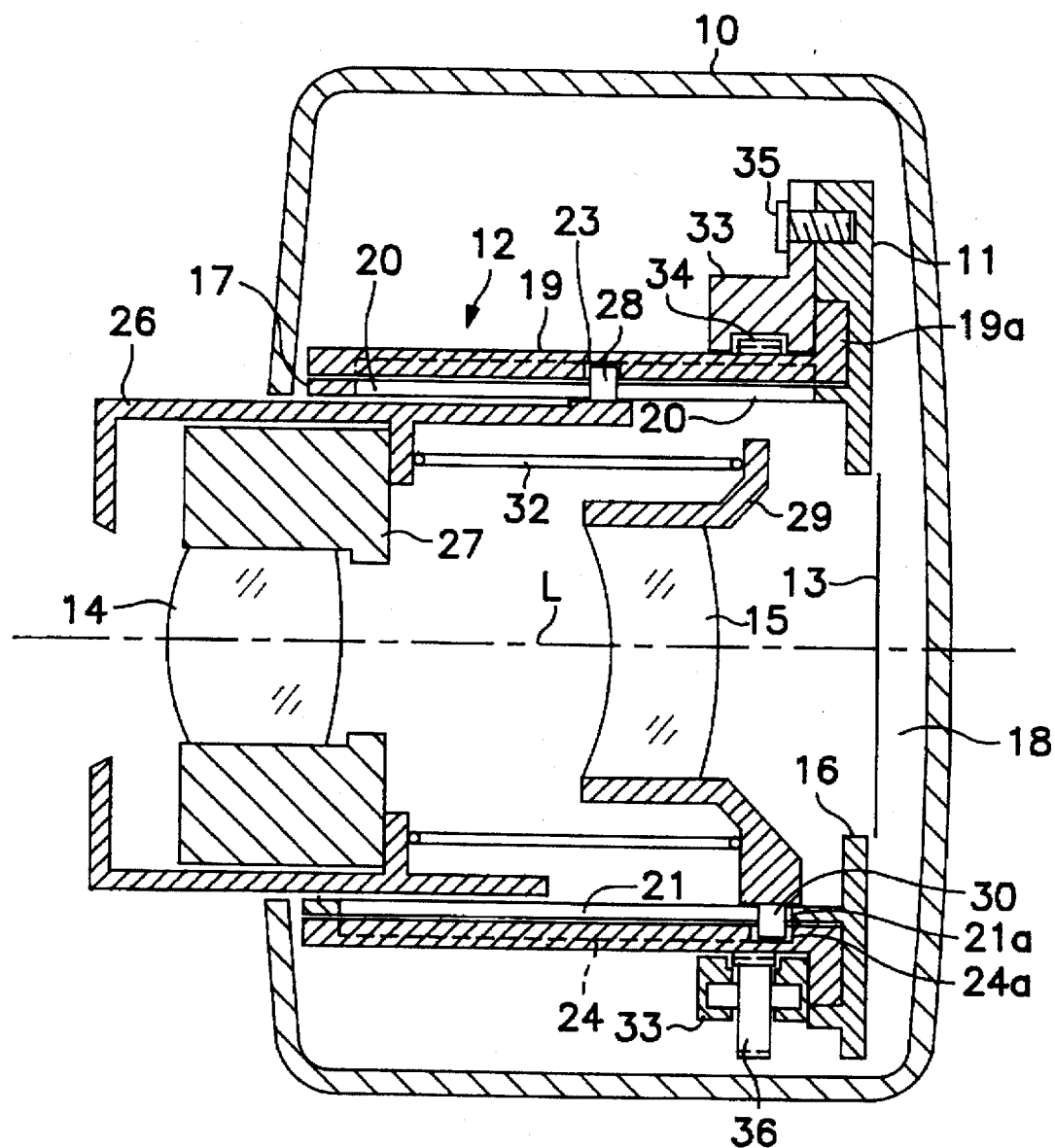
FIG. 2 is a cross sectional diagram of a Wide state of the lens barrel shown in FIG. 1.
Figure 3:
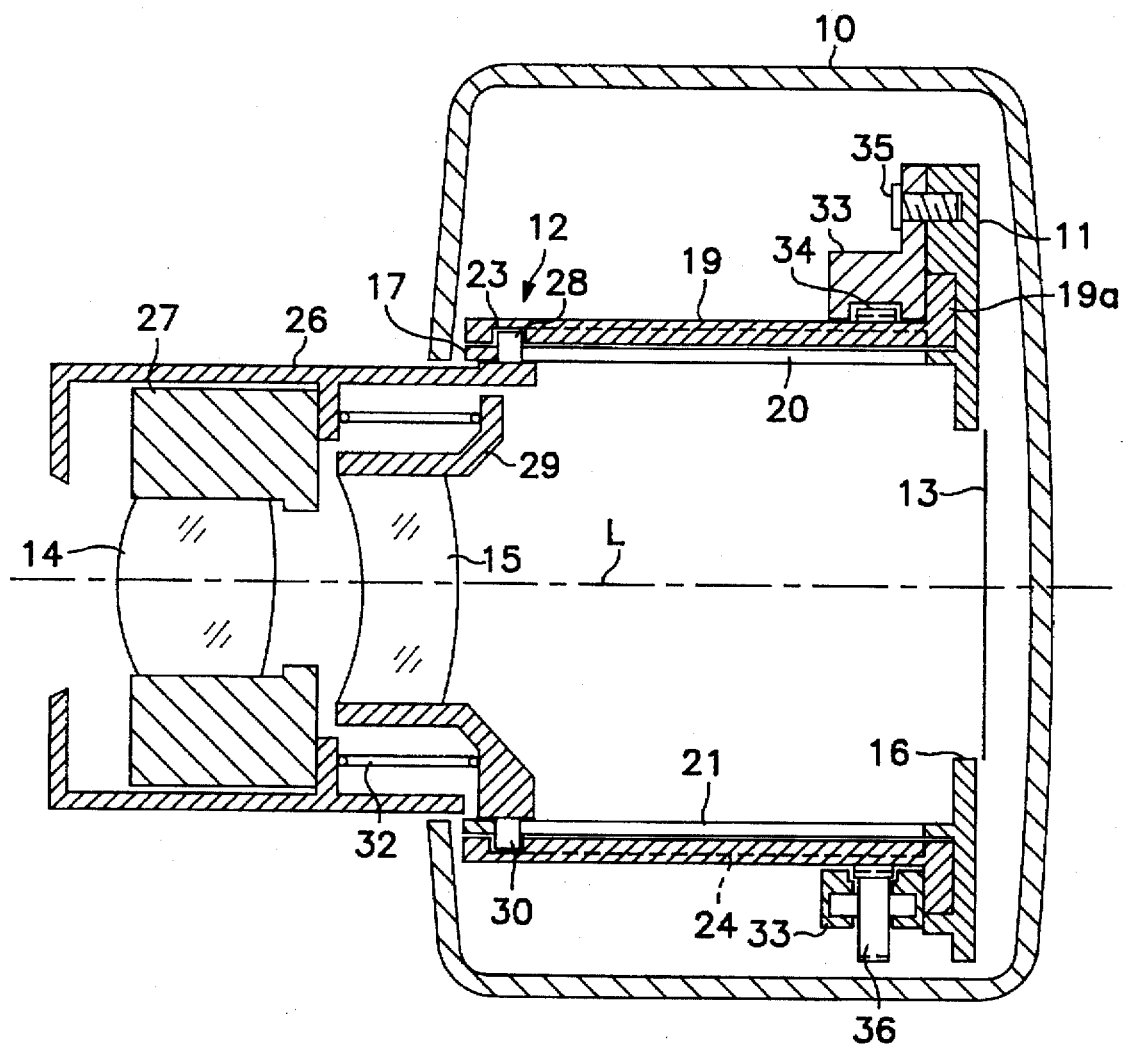
FIG. 3 is a cross sectional diagram of a Telephoto state of the lens barrel shown in FIG. 1.
Figure 4:
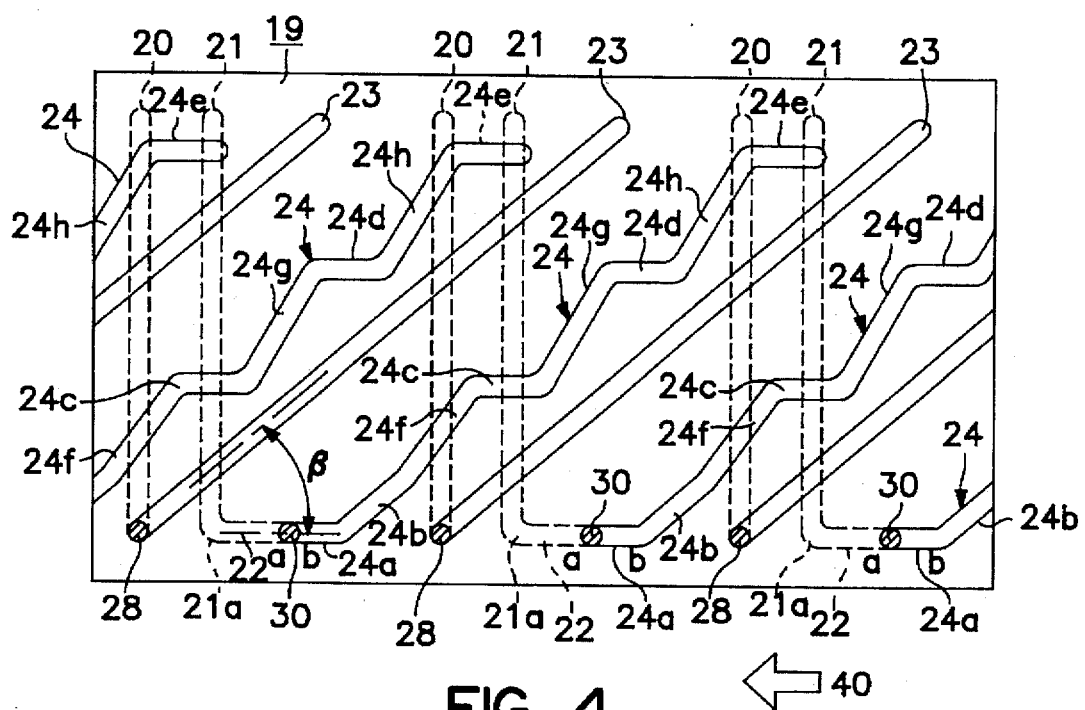
FIG. 4 is a detailed diagram of a zoom cam ring, showing the shape of guide grooves and cam grooves, and the relationship between these grooves.
Figure 5:
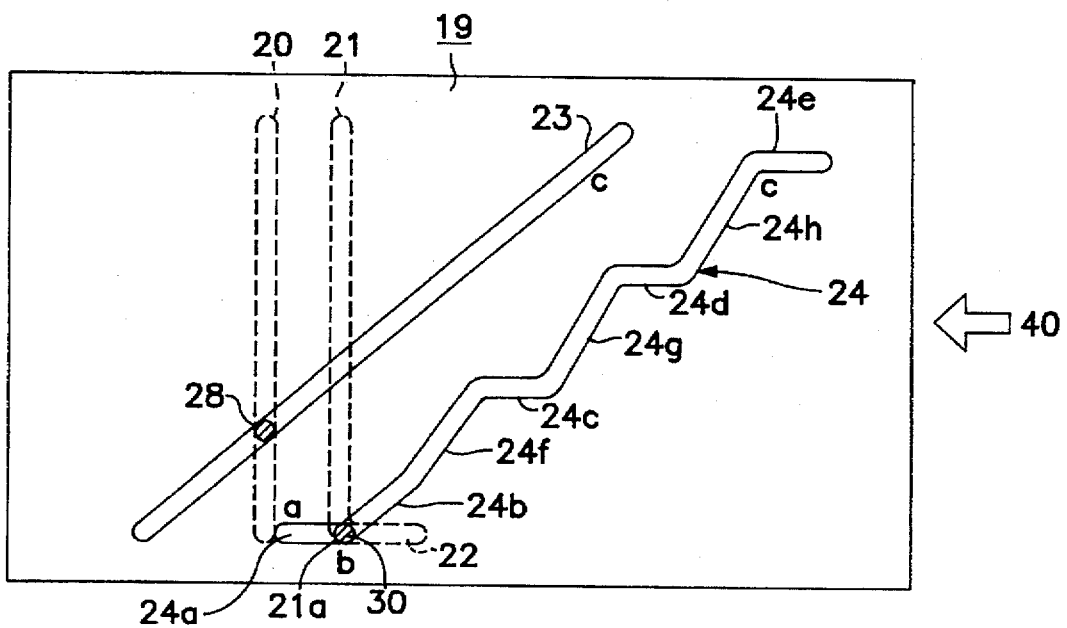
FIG. 5 is a detailed diagram of a portion of the zoom cam ring of FIG. 4 for a lens barrel in the Wide state.

FIG. 1 is a cross sectional diagram depicting a collapsed state of a preferred embodiment of a lens barrel according to the present invention. FIG. 2 is a cross sectional diagram showing a Wide state of the lens barrel shown in FIG. 1, in which the interval between a pair of lens groups is greatest. FIG. 3 is a cross sectional diagram showing the Telephoto state of the same lens barrel. FIGS. 4 and 5 are detailed diagrams showing the shape and relationship of guide grooves and cam grooves in a zoom cam ring in a preferred embodiment according to the present invention. FIG. 4 is a diagram showing a whole zoom cam ring for the lens barrel in the collapsed state. FIG. 5 is a diagram showing one set of guide grooves and cam grooves in the zoom cam ring for the lens barrel in the Wide state.

In FIGS. 1-3, the symbol 10 denotes the camera body. The following are located in the interior of camera body 10: a camera body frame 11, a zoom type lens barrel 12, a photographic film 13, first lens group 14 and second lens group 15 which constitute both the focusing lens (lens for focusing use) and the zooming lens (lens used for changing focal length) of a photographic optical system, etc. An aperture 16 is formed in the approximate center of the camera body frame 11 and a tubular straight guide tube 17 is integrally formed with the camera body frame and extends through the camera body 10 in the optical axis L direction, perpendicular to the aperture 16. The straight guide tube 17 communicates at its front surface side with the aperture 16. A film passage 18 through which a photographic film 13 travels is at the rear side of the aperture 16.

The zoom type lens barrel 12 consists of the straight guide tube 17, the first and second lens groups 14 and 15 which are freely located for respective back and forth movement within the straight guide tube 17, a zoom cam ring 19 fitted to rotate freely in the outer circumference of the straight guide tube 17, and an electric motor for driving use (not shown in the drawing), which drives this zoom cam ring 19 for rotation.

Multiple sets of guide grooves are formed in the outer circumference of the straight guide tube 17. For example, three sets of first and second guide grooves 20 and 21, are respectively formed parallel to the optical axis direction and are equally distributed in the circumferential direction. The first guide groove 20 is a straight groove parallel to the optical axis L and regulates the rotation and stroke movement of the first lens group 14. The second guide groove 21 is similarly a straight groove parallel to the optical axis L, and is formed adjacent to the first guide groove 20.

Figure 8:
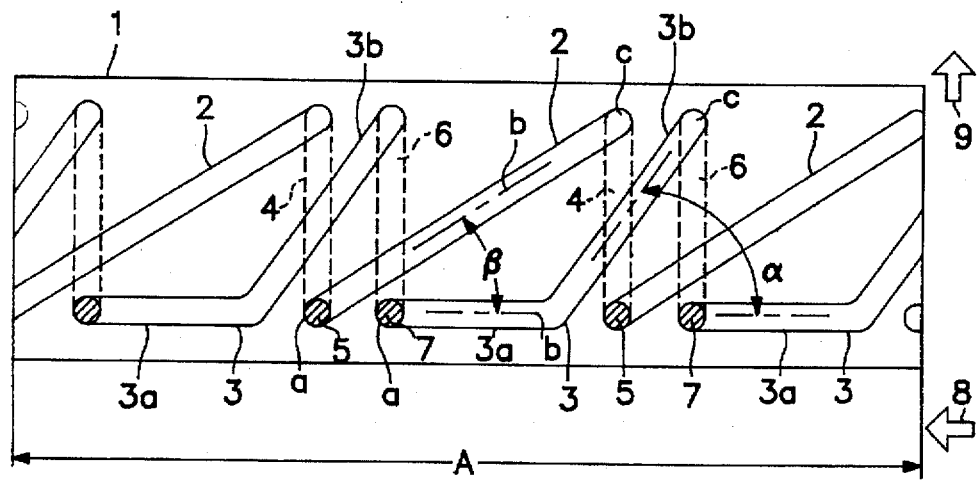
FIG. 8 is a detailed diagram of a zoom cam ring, showing the shape of guide grooves and cam grooves, and the relationship between these grooves, of a prior art lens barrel.
Figure 9:
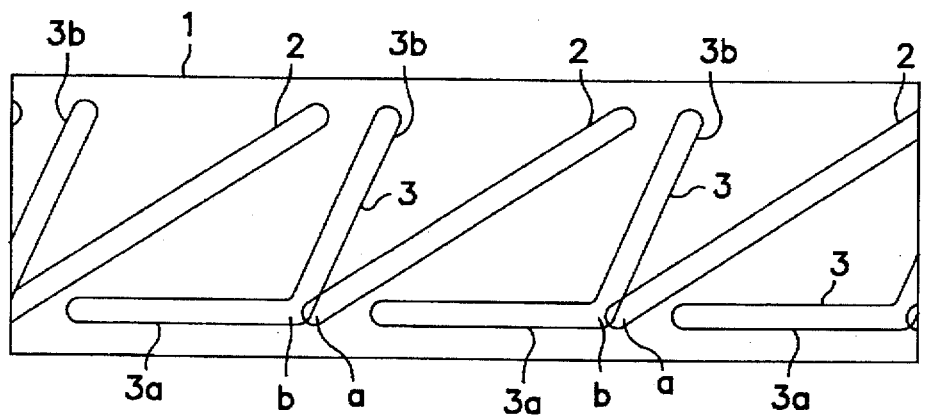
FIG. 9 is a diagram depicting the potential interference of cam grooves of the prior art; and, FIG. 10 is a diagram depicting the potential interference of cam grooves of the prior art.
Figure 10:
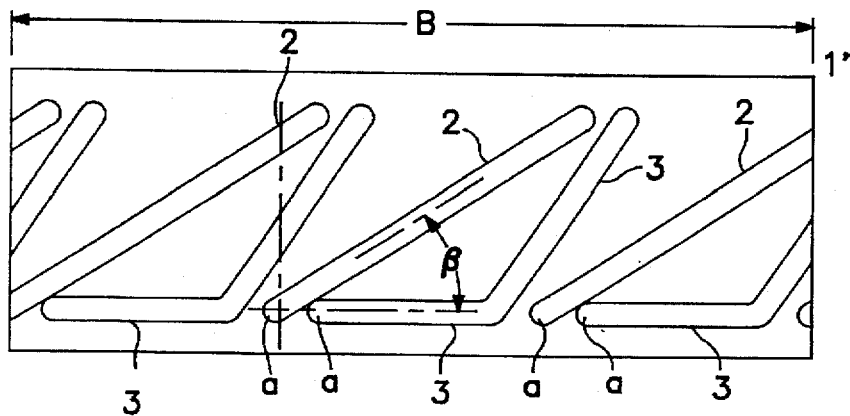

In contrast to the second guide groove 6 of the prior art depicted in FIG. 8, the present invention includes a collapsing use groove portion 22 which extends from the film side end 21a of the second guide groove 21 at right angles to the axial line of the straight guide tube 17 (as seen in FIG. 4). The collapsing use groove portion 22 is perpendicular to the optical axis or parallel to the film surface (or image surface) of the photographic film 13 and extends in the direction away from the first guide groove 20. The collapsing use groove portion 22 need not be exactly perpendicular to the optical axis or exactly parallel to the film surface, but could be as close to being perpendicular (substantially perpendicular) to the optical axis as possible or as close to being parallel (substantially parallel) to the film surface as possible. The collapsing use groove portion 22 has a length which allows the groove to overlap a portion of the second cam groove 24 when the lens groups 14 and 15 are collapsed together (discussed in detail below).

The first lens group 14, is positioned via the shutter mechanism unit 27 in the first lens holder 26. The first lens holder 26 is fitted to slide freely within the straight guide tube 17. Three coupling pins 28 project from the rear end portion on the circumferential surface of the first lens holder 26. Each of the three coupling pins 28 are respectively inserted into each of the three first guide grooves 20 formed in the straight guide tube 17. The movement of the first lens holder 26 is regulated by the movement of the coupling pins 28 along the first guide grooves 20 in the optical axis direction.

The second lens group 15 is positioned between the first lens group 14 and the aperture 16. The second lens group 15 is supported in the second lens holder 29 which is fitted to slide freely within the straight guide tube 17. Three coupling pins 30 project from the rear end portion on the circumferential surface of the second lens holder 29. Each of the three coupling pins 30 are respectively inserted into each of the three second guide grooves 21 formed in the straight guide tube 17. The movement of the second lens holder 29 is regulated by the movement of the coupling pins 30 along the second guide grooves 21 in the optical axis direction. Moreover, a compression coil spring 32 is resiliently fitted between the first lens holder 26 and the second lens holder 29 to urge the second lens group 15 in a rearward direction and to prevent its floating.

The zoom cam ring 19 has an integrally projecting flange portion 19a in the end portion (the film 13 side) on the outer circumferential surface. The flange portion 19a is fitted to rotate freely in the outer circumference of the straight guide tube 17. The flange portion 19a is also slidably and rotatably supported by means of a ring-shaped compression member 33 and the front surface of the camera body frame 11. Moreover, a gearwheel 34 is formed adjacent to the flange portion 19a on the outer circumferential surface of the zoom cam ring 19.

Furthermore, three sets of first and second cam grooves 23 and 24 are alternately formed in the outer circumferential surface of the zoom cam ring 19 (see FIG. 4). These three sets of first and second cam grooves 23 and 24 are equally distributed in the circumferential direction around the zoom cam ring 19. The first cam grooves 23 are an oblique zoom groove intersecting the optical axis at a predetermined angle. The first cam grooves 23 are coupled to the straight guide tube 17 by coupling pins 28 inserted through the first guide grooves 20 and into the first cam grooves 23. The back and forth movement of the first lens group 14 is regulated by the movement of the coupling pins 28 mutually along the first guide grooves 20 arid the first cam grooves 23.

On the other hand, the second cam grooves 24 are step-shaped crooked grooves. Each second cam groove 24 consists of a collapsing use groove portion 24a formed in the circumferential direction of the zoom cam ring 19 parallel to the image surface (or perpendicular to the optical axis) and positioned near the side of the zoom cam ring 19 that is closer to the film 13. The collapsing use groove portion 24a need not be exactly parallel to the image surface or exactly perpendicular to the optical axis, but could be as close to being parallel (substantially parallel) to the image surface as possible or as close to being perpendicular (substantially perpendicular) to the optical axis as possible. The length of the collapsing use groove portion 24a is as short as the length of the collapsing use groove portion 22 of the second guide groove 21. Each second cam groove 24 also consists of focusing regions 24b, 24c, 24d and 24e. Between each of these focusing regions are zooming regions 24f, 25g and 24h. The second cam grooves 24 are coupled to the straight guide tube 17 by coupling pins 30 inserted through the second guide grooves 21 and into the second cam grooves 24. The movement of the second lens group 15 is regulated by the movement of the coupling pins 30 mutually along the second guide grooves 21 and the second cam grooves 24.

In FIGS. 1–3, the compression member 33 is fixed to the front side of the camera body frame 11 by means of a screw 35. Moreover, this compression member 33 shaft supports a gear 36 which engages with the gearwheel 34 of the zoom cam ring 19 for free rotation. Then, by means of the gear 36 being driven to rotate by means of an electric motor for drive use (not shown in the drawing) when zooming motion, is performed, the zoom cam is caused to rotate to extend or retract the lens groups 14 and 15.

The camera depicted in FIG. 1 is a collapsible mount type camera. According to the present invention, in the collapsed state shown in FIG. 1, the first lens holder 26 is completely immersed within the straight guide tube 17. In the collapsed state, the coupling pins 28 of the first lens holder 26, as shown in FIG. 4, are positioned in the film side ends of the first guide groove 20 and the first cam groove 23. The coupling pins 30 of the second lens holder 29 are positioned in the right end of the collapsing use groove portion 22 (the end opposite the film side end 21a) of the second guide groove 21 and in the collapse end "a" in the collapsing use groove portion 24a on the film side end of the second cam groove 24.

Movement of the lens groups from the collapsed state shown in FIG. 1 into a Wide state shown in FIG. 2 is now described. The zoom lens ring 19 is caused to rotate in the extension direction 40 (the direction of the arrow 40 shown in FIGS. 4 and 5) by being driven by the aforementioned single driving source (i.e., an electric motor or the like). As shown in FIG. 5, the first cam groove 23 moves to the left and the coupling pins 28 are forced by the groove wall surface of the first cam groove 23 to move along the first guide groove 20 in the subject direction. Accordingly, the first lens group 14 is moved forward integrally with the lens holder 26 and projects to the exterior of the camera body 10 from the straight guide tube 17.

Moreover, when the zoom cam ring 19 rotates in the extension direction 40, the second cam groove 24 also moves to the left, as shown in FIG. 5. Because the collapsing use groove portion 22 of the second guide groove 21 and the collapsing use groove portion 24a of the second cam groove 24 mutually overlap, the coupling pin 30 moves to the film side end 21a of the second guide groove 21 and to the wide end "13" of the collapsing use groove portion 24a. Because the collapsing use groove portions 22 and 24a are formed substantially parallel to the image surface, the coupling pin 30 is not moved forward along the guide groove 21. Accordingly, the second lens group 15 stays in the collapsed position. Thus, when the zoom cam ring 19 rotates for an amount necessary to move the coupling pin through the length of both the collapsing use groove portions 22 and 24a, the coupling pin 30 reaches the wide end "b" of the collapsing use groove portion 24a and the Wide state of the first and second lens groups 14 and 15 is set, as shown in FIG. 2.

In the transition between the collapsed end "a" and the wide end "b", there is a risk that floating of the coupling pins 30 in the circumferential direction of the zoom cam ring 19 within the collapsing use groove portion 22 could lead to an undesirable rotation of the second lens group 15. However, with the urging applied in the rearward direction by the spring 32, the floating and rotation of the second lens group 15 is prevented.

When the zoom cam ring 19 is rotated further in the extension direction 40 from the Wide state, the coupling pins 28 and 30 move along the first and second guide grooves 20 and 21 in the direction of the photography subject. The coupling pin 30 moves through successive focusing and zooming regions in the second cam groove 24 while guided by the second guide groove 21. Alternate focusing movement (movement changing the interval between the lens groups 14 and 15) and zooming movement (movement changing the focal length) is performed until the coupling pin finally comes to a stop in the telephoto end "c" of cam grooves 23 and 24. As a result, the first and second lens groups 14 and 15 are set in the Telephoto state, as shown in FIG. 3.

The relationship between the first and second lens groups 14 and 15 during the movement of the coupling pins 28 and 30 along the grooves 20, 21, 23, and 24 will now be discussed in more detail. When the zoom cam ring 19 rotates from the Wide state at the wide end "b", coupling pin 28 moves further along the first cam groove 23 while moving along the focusing region 24b. The focusing region 24b is formed substantially parallel to (or very close to being parallel, not necessarily exactly parallel) the first cam groove 23; therefore, the coupling pins 28 and 30 are extended by the same amount relative to each other. Thus, the first and second lens groups 14 and 15 move together without a change in the interval between them during this period of movement. Because the interval between the lens groups 14 and 15 does not change in the focusing region 24b, focusing with the lens groups 14 and 15 set in the Wide state is accomplished by moving the pair of lens groups 14 and 15 in the optical direction to align the distance of the pair of lens groups 14 and 15 from the film 13 to match the focal length required in the Wide state.

When the zoom cam ring 19 is caused to rotate through the zooming region 24f, coupling pin 30 reaches the focusing region 24c of the next forward movement distance where the focal length is greater. The focusing region 24c is formed substantially parallel to the image surface. Because of this, coupling pin 30 does not move in the optical axis direction, but coupling pin 28 moves in the optical axis direction guided by the first cam groove 23. As a result, the interval between the first and second lens groups 14 and 15 increases as the zoom cam ring 19 moves in the extension direction 40. Accordingly, focusing is performed with only the first lens group 14 moving. The zooming and focusing at other focusing distances are similarly performed at the zooming regions 24g and 24h and the focusing regions 24d and 24e.

When the electric motor drives the zoom cam ring 19 in extension direction 40, the zoom cam ring 19 rotates in the retraction direction. The coupling pins 28 and 30 move toward the film 13 side along the first and second guide grooves 20 and 21. The first and second lens groups 14 are 15 are respectively retracted into the lens barrel 12. With sufficient rotational driving, the lens groups 14 and 15 can be returned to the collapsed state shown in FIG. 1 from the Telephoto state shown in FIG. 3 and through the Wide state shown in FIG. 2.

Figure 6:
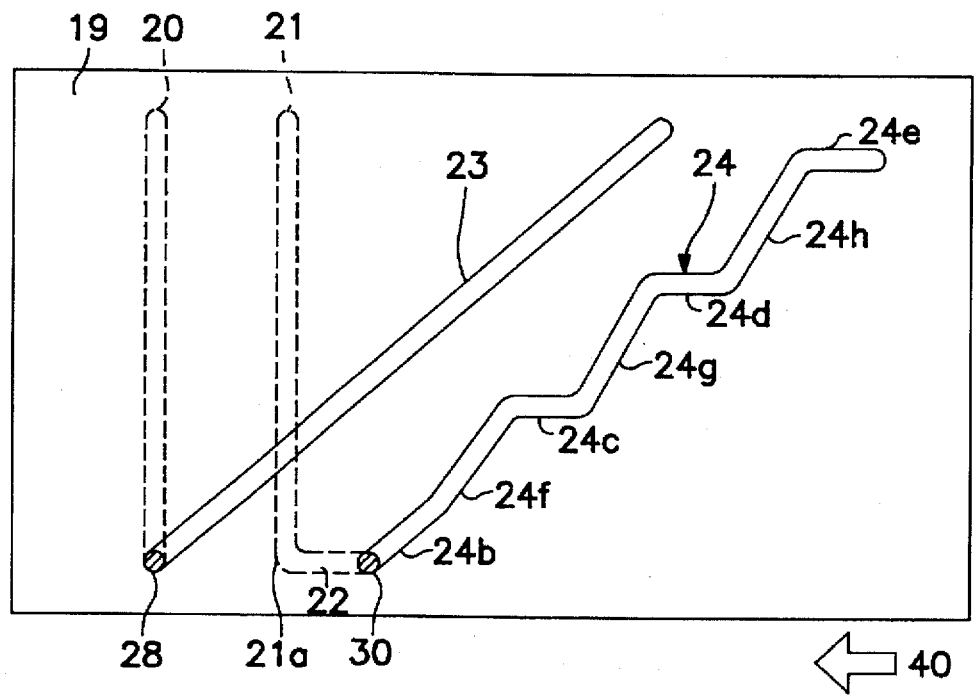
FIG. 6 is a detailed diagram of a portion of a zoom cam ring, showing the shape of guide grooves and cam grooves, and the relationship between these grooves, according to another embodiment of the present invention.
Figure 7:
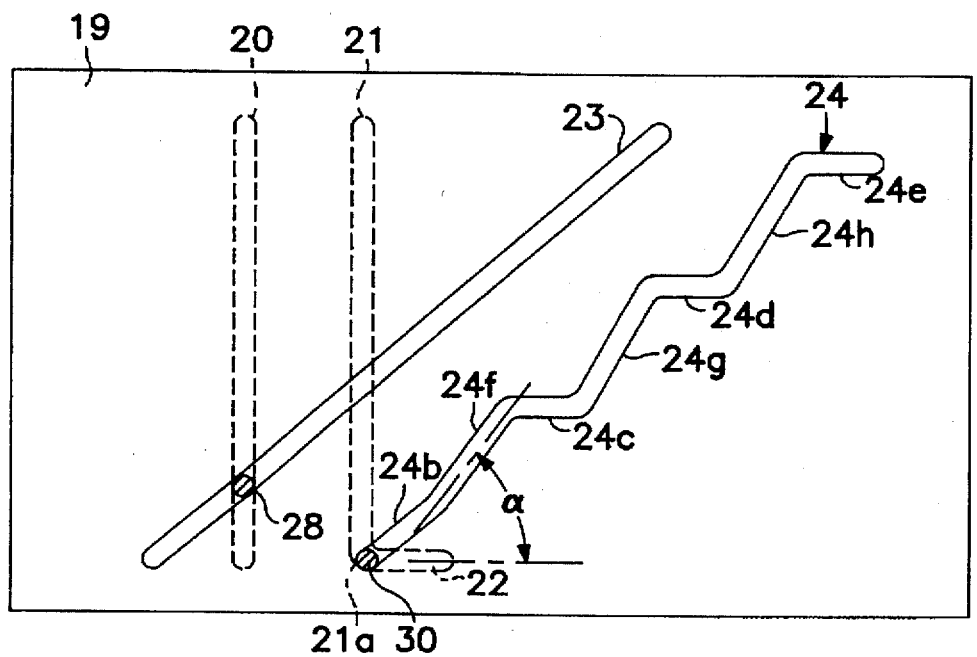
FIG. 7 is a detailed diagram of the zoom cam ring of FIG. 6 for a lens barrel in the Wide state.

FIGS. 6 and 7 are detailed diagrams of a zoom cam ring 19 according to another preferred embodiment of the present invention. The relationship of the guide grooves and the cam grooves in the collapsed state (FIG. 6) and in Wide state (FIG. 7) are shown.

In this embodiment, the second cam groove 24 is a stepped cam groove, inclined with respect to the optical axis. The second cam groove 24 consists of the focusing regions 24b, 24c, 24d, and 24e, and the zooming regions 24f, 24g, and 24h therebetween. Similar to the previous embodiment, from the film side end 21a of the second guide groove 21, a collapsing use groove portion 22 extends substantially parallel to the image surface in the direction away from the first guide groove 20. But unlike the previous embodiment, the collapsing use groove portion 24a of the second cam groove 24 is omitted and only the collapsing use groove portion 22 of the second guide groove 21 provides the collapsing feature. Other features of this embodiment are similar to the previous embodiment and repetitive descriptions will be omitted.

According to the preferred embodiments of the present invention, various benefits may be achieved. For instance, the collapsing use groove portion 22 of the second guide groove 21 provides the collapsing movement required for a short and compact collapsible mount type camera. The use of the collapsing use groove portion 22 of the second guide groove 21 may be combined with the collapsing use groove portion 24a of the second cam groove 24 in the first embodiment (see FIGS. 4 and 5). Or, the collapsing use groove portion 22 of the second guide groove 21 may be used solely to provide the collapsing movement, as in the second embodiment (see FIGS. 6 and 7). With the collapsing use groove portion 22, lens groups 14 and 15 may be reliably collapsed together to provide a desirably thin and compact camera, without creating any interference between any cam grooves in the zoom cam ring 19.

With the combined use of collapsing use groove portions 22 and 24a of the first embodiment, the collapsing use groove portion 24a can be considerably shortened, while keeping the interval between the lens groups small in the collapsed state. The length of the groove portion 3a of the prior art, used for collapsing, may be equally split between a portion of the guide groove and a portion of the cam groove. Thus, the length of the collapsing use groove portion 24a may be made as short as the length of the collapsing use groove portion 22. Because of this, even if the amount of stroke and rotation angle of the first and second cam grooves 23 and 24 are the same, the collapse amount from the wide end "b" to the collapsed or received state may be dramatically increased to make the camera body thin and compact, while reliably preventing any interference between cam grooves 23 and 24.

In addition, even if the lens barrel diameter is made small to make the camera more compact, because the first cam groove 23 and the collapsing use groove portion 24a of the second cam groove 24 have a separation in excess of just the length of the collapsing use groove portion 22, it is not necessary for the angle β of inclination of the first cam groove 23 with respect to the image surface to be large and interference of the first and second cam grooves 23 and 24 can be prevented. Moreover, if the angle β of inclination is small, the rotational load when rotating the zoom cam ring 19 is also small and the use of a small type of electric motor is possible.

With the second embodiment, because the collapsing use groove portion 24a is omitted, the angle α of inclination of the second cam groove 24 can be made smaller in contrast to the previous embodiment. If the angle α of inclination is made small, the load for driving the zoom cam ring 19 can be reduced and the driving source (i.e., an electric motor or the like) can be miniaturized. But, when the angle α, of inclination becomes smaller, the circumferential length of the cam becomes long. Nevertheless, a large lens barrel diameter may be effectively adopted with an improved collapse amount, with the present invention, to shorten the lens barrel and reduce costs. The precision of the cam portion also increases with a longer cam diameter. Furthermore, if there is no collapsing use groove portion 24a, the coupling pin 30 does not float and the lens holders 28 and 29 will not rotate.

Moreover, as previously mentioned, a collapsing use groove portion 22 and 24a (or just 22 as in FIGS. 6 and 7) already extends substantially parallel to the image surface. The lens groups 14 and 15 are brought to a Wide state by traversing through the collapsing use groove portion(s). According to the present invention, the collapsing movement and the extension movement to the Wide state are integrated. Thus, the lens barrel may smoothly and successively perform focusing, zooming, and collapsing movements during the extension and retraction of the lens groups 14 and 15.

With the collapsing movement integrated with the extension to the Wide state, the focusing region 24b may also be made oblique (such that it is parallel or substantially parallel to the first cam groove 23). This positioning of the focusing region 24b is different than the positioning of other focusing regions 24c. 24d, and 24e, which are substantially parallel to the image surface. If the focusing region 24b was also formed substantially parallel to the image surface, the overall lateral length of the second cam groove 24 (i.e., in the circumferential direction) would increase. As a result, the rotation angle of the zoom cam ring 19 would also increase or portions of the second cam groove 24 may overlap and interfere with the first cam groove 23 adjacent to it on the right-hand side. Thus, according to the present invention, the oblique positioning of the focusing region 24b (wherein the lens system is in the Wide state) allows for a more effective spacing between cam grooves, prevents unnecessary overlapping and interference between cam grooves, and keeps the rotation angle of the zoom cam ring 19 low.

The present invention is not limited to the lens barrel of the above embodiments. For example, the second cam groove 24 is not limited to the step shape of the above embodiments. The second cam groove 24 may also be shaped like the cam groove 3 of the prior art, with a groove portion parallel to the image surface and another groove portion inclined with respect to the optical axis. But, according to the present invention, the collapsing function may be split between a collapsing use groove portion 22 of the second guide groove 21 and the horizontal groove portion of the second cam groove; thus considerably shortening the horizontal focusing portion of the second cam groove.

Also, the first cam groove 23 is not limited to a straight inclined form. Some of the focusing and/or zooming regions from the second cam groove 24 may be relocated on the first cam groove 23 instead (with the corresponding regions on the second cam groove 24 being commensurately replaced with the shape of the straight inclined form of the first cam groove 23).

The present invention is also not limited to the first guide groove 20 and the first cam groove 23 of the above embodiments. For example, a well-known helicoid may be used instead. Instead of using the combination of the first guide groove 20 and the first cam groove 23 to move the first lens group 14, a well known helicoid may be used. In this case, the second cam groove 24 may maintain a stepped form and the second guide groove 21 and the collapsing use groove portion 22 may be combined with the lead of this helicoid.

Moreover, various modifications may be made to the structures in the lens barrel. For example, the zoom type lens barrel 12 may have three or more lens groups instead of just the two lens groups 14 and 15. Extension, retraction, and collapsing of the larger plurality of lens groups may also be accomplished according to the present invention. The locations of the guide grooves and the cam grooves may be reversed (i.e., the cam grooves 23 and 24 may be formed in the straight guide tube 17 and the guide grooves 20 and 21 may be formed in the zoom cam ring 19). Manual rotation of the zoom cam ring 19 is also possible, besides using an electric motor or actuator as the driving source.

In addition, a double tube structure may be adopted, wherein a separate rotary tube is arranged outside the zoom cam ring 19. The focusing regions of cam groove 24 may be relocated to this secondary rotary tube to separately control focusing at arbitary focal lengths.

It should be understood that the lens barrel according to the invention is particularly suitable for a camera and that the term camera is not used in a narrow sense but can include different types of camera devices, such as still cameras, video cameras, and the like. Moreover, although a few preferred embodiments of the present Invention have been shown and described, it would be appreciated by those skilled in the art that changes may be made in these embodiments without departing from the principles and spirit of the invention, the scope of which is defined in the claims and their equivalents.

What is claimed is:

1. A lens barrel, comprising:
   a first lens group;
   a second lens group;
   a first tube having
      first and second guide grooves to respectively guide the first and second lens groups in an optical direction, and
      a first collapsing use groove extending substantially perpendicular to the optical axis from an end of the second guide groove that is closer to an image surface to maintain the second lens group in a stationary position on the optical axis when the first lens group is collapsed toward the second lens group; and
   a second tube having first and second cam grooves to respectively guide the first and second lens groups, in conjunction with the first and second guide grooves, for focusing and zooming operations, wherein the first cam groove is inclined from the optical axis and the second cam groove includes a wide state focusing portion extending substantially parallel to the first cam groove from an end of the second cam groove that is closer to the image surface to guide the second lens group uniformly with a movement of the first lens group for focusing of the first and second lens groups in the wide state.

2. A lens barrel as recited in claims 1, wherein the second cam groove is a stepped groove having alternating zooming portions and focusing portions formed above the wide state focusing portion, wherein the zooming portions are inclined from the optical axis and are used for the zooming operation, and the focusing portions are substantially perpendicular to the optical axis and are used for the focusing operation.

3. A lens barrel, comprising:
   a first lens group;
   a second lens group;
   a first tube having
      first and second guide grooves to respectively guide the first and second groups in an optical direction, and
      a first collapsing use groove extending approximately perpendicular to the optical axis from an end of the second guide groove that is closer to an image surface to maintain the second lens group in a stationary position on the optical axis when the first lens group is collapsed toward the second lens group; and
   a second tube having
      first and second cam grooves to respectively guide the first and second lens groups, in conjunction with the first and second guide grooves, for focusing and zooming operations, and
      a second collapsing use groove extending approximately perpendicular to the optical axis from an end of the second cam groove that is closer to the image surface and overlapping the first collapsing use groove of said first tube to maintain the second lens group in a stationary position on the optical axis when the first lens group is collapsed toward the second lens group.

4. A lens barrel as recited in claim 3, wherein the first and second collapsing use grooves maintain the second lens group in a stationary position on the optical axis when the first lens group is extended into a wide state.

5. A lens barrel as recited in claim 3, wherein the first cam groove is inclined with respect to the optical axis and the second cam groove includes a wide state focusing portion extending substantially parallel to the first cam groove from an end of the second collapsing use groove portion to guide the second lens group uniformly with a movement of the first lens group for focusing of the first and second lens groups in the wide state.

6. A lens barrel as recited in claim 5, wherein the second cam groove is a stepped groove having alternating zooming portions and focusing portions formed above the wide state focusing portion, wherein the zooming portions are inclined from the optical axis and are used for the zooming operation, and the focusing portions are substantially perpendicular to the optical axis and are used for the focusing operation.

7. A lens barrel comprising:

a first lens group;

a second lens group;

a first tube having
- first and second guide grooves to respectively guide the first and second groups in an optical direction, and
- a first collapsing use groove extending approximately perpendicular to the optical axis from an end of the second guide groove that is closer to an image surface to maintain the second lens group in a stationary position on the optical axis when the first lens group is collapsed toward the second lens group and when the first lens group is extended into a wide state; and a second tube having
- first and second cam grooves to respectively guide the first and second lens groups, in conjunction with the first and second guide grooves, for focusing and zooming operations, and
- a second collapsing use groove extending approximately perpendicular to the optical axis from an end of the second cam groove that is closer to the image surface and overlapping the first collapsing use groove of said first tube to maintain the second lens group in a stationary position on the optical axis when the first lens group is collapsed toward the second lens group,
- wherein the first cam groove is inclined with respect to the optical axis and the second cam groove includes a wide state focusing portion extending approximately parallel to the first cam groove from an end of the second collapsing use groove portion to guide the second lens group uniformly with a movement of the first lens group for focusing of the first and second lens groups in the wide state, and
- wherein the second cam groove is a stepped groove having alternating zooming portions and focusing portions formed above the wide state focusing portion, wherein the zooming portions are inclined from the optical axis and are used for the zooming operation, and the focusing portions are approximately prependicular to the optical axis and are used for the focusing operation.

8. A lens barrel, comprising:

a first lens group;

a second lens group;

a collapsing use groove extending substantially perpendicular to the optical axis to maintain the first lens group in a stationary position on the optical axis when the second lens group is collapsed toward the first lens group; and a stepped cam groove, extending from said collapsing use groove, having
- a wide state focusing portion to focus the first and second lens groups in a wide state, and
- alternating zooming portions and focusing portions formed above said wide state focusing portion, wherein the zooming portions are inclined from the optical axis and are used for a zooming operation, and the focusing portions are substantially perpendicular to the optical axis and are used for a focusing operation.

9. A lens barrel, comprising:

a first lens group;

a second lens group;

a first tube having a first collapsing use groove formed on a guide groove; and a second tube having a second collapsing use groove formed on a cam groove, wherein said first and second collapsing use grooves overlap and extend substantially perpendicular to the optical axis to maintain the first lens group in a stationary position on the optical axis when the second lens group is collapsed toward the first lens group.

* * * * *

UNITED STATES PATENT AND TRADEMARK OFFICE
CERTIFICATE OF CORRECTION

PATENT NO. :  5,687,029
DATED : November 11, 1997
INVENTOR(S) : Junichi OMI et al.

It is certified that error appears in the above-indentified patent and that said Letters Patent is hereby corrected as shown below:

Col. 12, Claim 2,    line 20, change "claims" to --claim--;

Col. 14, Claim 7,    line 5, change "prependicular" to --perpendicular--.

Signed and Sealed this

Twenty-first Day of April, 1998

Attest:

BRUCE LEHMAN

*Attesting Officer*    *Commissioner of Patents and Trademarks*